United States Patent Office 3,457,112
Patented July 22, 1969

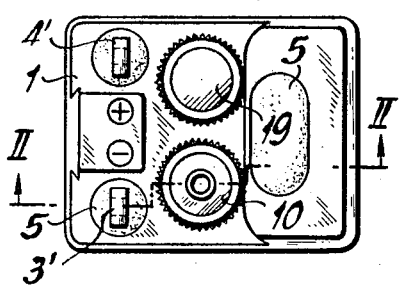
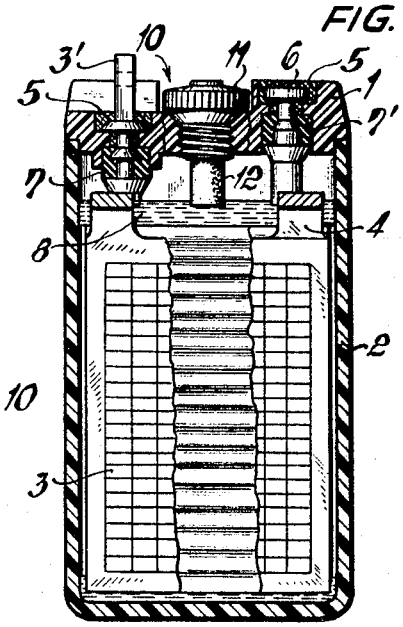
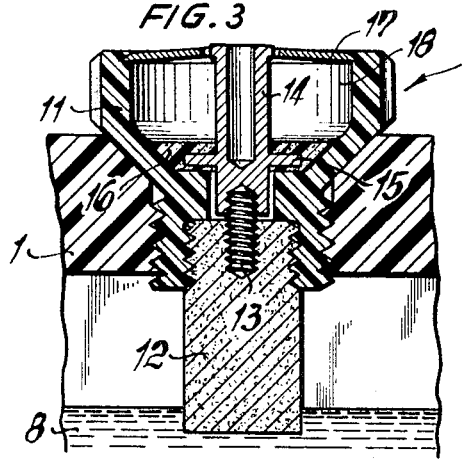
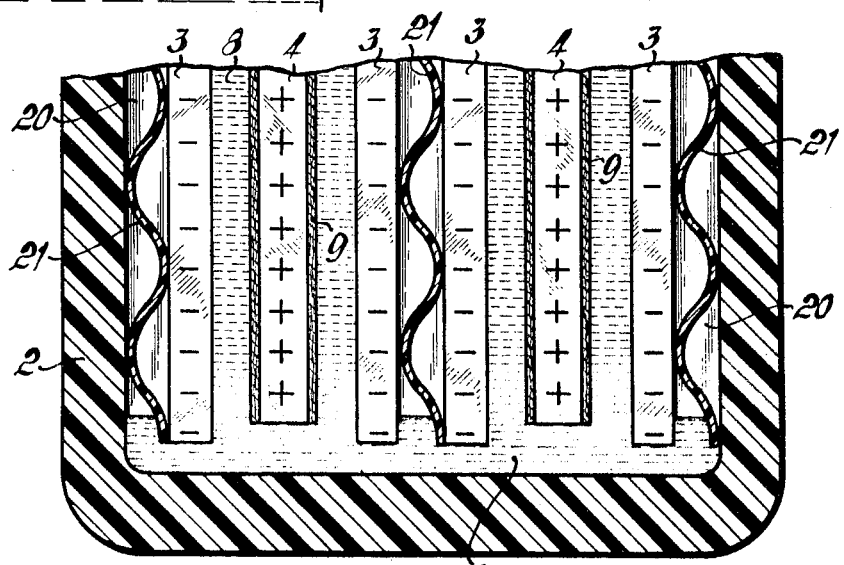

3,457,112
LEAD-ACID STORAGE BATTERY
Harald Reber, Stuttgart-Feuerbach, Germany, assignor to Robert Bosch G.m.b.H., Stuttgart, Germany
Filed Mar. 4, 1966, Ser. No. 531,930
Claims priority, application Germany, Mar. 9, 1965, B 80,881
Int. Cl. H01m 39/04
U.S. Cl. 136—26                         19 Claims The present invention relates to lead-acid storage batteries and, more particularly, the present invention is concerned with a lead-acid storage battery the positive and negative electrodes of which comprise grid plates consisting essentially of lead and being free of antimony, and active lead mass located in the free spaces and interstices of the grid plates.

Lead-acid storage batteries with electrode plates of the above-described type are considerably more advantageous than lead-acid storage batteries with foil electrodes, they supply greater electric power and capacity and, furthermore, the lead-acid batteries including grid electrodes which are free of antimony are not subject to the disadvantages which are unavoidably connected with the use of antimony. These disadvantages include the side effects which eventually occur during the operation of batteries with antimony-containing grid plates due to the freeing of antimony, such as self-discharge caused by the formation of localized elements at the negative electrode surfaces, and the formation of poisonous antimony hydride gases and thus the decomposition of the electrolyte liquid under formation of a gas which cannot be recombined to water in any practical manner.

Conventional lead-acid batteries including grid plates which are free of antimony do not show the above-discussed technical disadvantages, however, they also do not have the technological and electrochemical advantages of lead acid batteries including grid plates wherein the lead grid is alloyed with antimony. The advantage of antimony-containing lead grids include the greater strength of such alloys known as hard lead, as well as the greater facility in shaping of the grids and the longer useful lifespan of such lead antimony grids as compared with grids made of pure lead or of lead which includes only small proportions of other hardening alloying metals such as arsenic, tellurium, mercury, cadmium, cobalt or calcium. The most important advantage of antimony-containing grid plates as compared to grid plates of pure lead or grid plates alloyed with any of the last-mentioned group of elements, is the higher operating capacity of lead-acid batteries including antimony-containing grid plates.

The high capacity of a lead-acid battery is the reason why lead-acid storage batteries are of such great technical and economical importance as compared with other storage battery types. This capacity will reach a maximum value after several charging and discharging cycles, which value is then more or less slowly reduced during the further use of the battery, particularly due to the loss of positive active mass. Lead-acid batteries of good quality have the ability to substantially maintain their highest capacity for about 200 charge and discharge cycles, however, only if the positive lead mass is applied to a grid consisting of a lead-antimony alloy. In the case of all antimony-free acid plates known up to now, irrespective of whether they consist of pure lead or of lead-calcium or of other antimony-free lead alloys, the same initial capacities can be obtained as with antimony-containing grids, however, by far not the advantageous performance with respect to maintenance of a high capacity during prolonged use such as is achieved with conventional lead-acid batteries provided with lead-antimony grids.

The decisive disadvantage of lead-acid batteries with antimony-free grids was found up to now in the fact that already after up to about 10 to 20 charge and discharge cycles, the capacity of such batteries drops to a value of at most 50% of the initial capacity, and in many cases even further to only between 10 and 20% of the initial capacity. This disadvantage cannot be overcome by using dispersion-hardened lead grids which, as known to those skilled in the art are obtained by a method of mixing metal oxide into the lead melt and which—if lead oxides are used—do not contain any extraneous materials such as alloying constituents. Such dispersion-hardened lead for grid plates generally consists of pure lead with an addition of metal oxides such as for instance, 0.1–5% of lead oxide or 0.1–5% of calcium oxide. The dispersion hardened lead is formed by compressing of lead powder having the desired oxide content at a pressure of between about 5 and 50 tons per cm.$^2$.

On the other hand, it was not possible up to now to incorporate alloying constituents or special additives to a positive active lead mass which would result in a performance of the battery with respect to capacity which even remotely approaches that which is obtained with antimony-containing lead grids. It seems—although this has not been fully established—that the antimony-containing lead grids are capable of forming a particularly highly conductive, capacity-maintaining zone of contact with the active lead mass of the respective grid electrode.

It is therefore an object of the present invention to overcome the above-discussed difficulties and disadvantages which are experienced in connection with grid plates-containing lead-acid batteries.

It is another object of the present invention to provide a lead-acid battery including grid electrodes, wherein the grid plates are free of antimony and nevertheless a performance of the battery can be achieved which is at least substantially equal to that of batteries containing lead-antimony grids, but without being subjected to the disadvantages connected with the use of lead-antimony grid plates.

Other objects and advantages of the present invention will become apparent from a further reading of the description and of the appended claims.

With the above and other objects in view, the present invention contemplates in a lead-acid storage battery, in combination, electrodes of opposite polarity, each of the electrodes comprising grid plate means consisting essentially of lead and being free of antimony, and active lead mass supported by the grid plate means, respectively, and a non-fluid electrolyte interposed between and contacting adjacent electrodes of opposite polarity, and non-fluid electrolyte consisting essentially of a mixture of aqueous sulfuric acid and in thickening agent in an amount sufficient to render the electrolyte non-fluid and including an alkaline earth metal compound which is insoluble in the aqueous sulfuric acid and free of metals other than alkaline earth metals, the alkaline earth metal compound being present in an amount in excess of 0.2% of the weight of the aqueous sulfuric acid.

Surprisingly, it has been found that an antimony-free lead-acid battery with antimony-free grid plates of any desired type will have the favorable capacity characteristics which up to now could be obtained only with lead-antimony grid plates, provided that, in accordance with the present invention, alkaline earth metal compounds are included in and distributed through the electrolyte and preferably also at least the positive electrode, in an amount equal to more than 0.2% of the electrolyte and/or the positive active mass, preferably in the form of compounds of calcium and strontium which will not interfere with the electrochemical processes taking place within the battery.

It has been found that the additions of alkaline earth metal compounds will improve the maintenance of capacity in such batteries, although no chemical or physical explanation for this phenomenon will be offered at the present time. It also has been found that beryllium and magnesium, as well as barium have a much more limited favorable effect than calcium and strontium compounds. Without limiting the present invention to specific theory, the more advantageous performance of calcium and strontium compounds may be due to the fact that the compounds of the other alkaline earth metals are considerably more or considerably less soluble than the corresponding calcium and strontium compounds in an aqueous sulfuric acid medium of the concentration most favorable for lead-acid storage battery.

For this reason, in accordance with the present invention, calcium and strontium compounds are primarily used as additive to the electrolyte and possibly also to the active mass. The calcium and strontium compounds are also preferred because they permit a much finer distribution as would be possible by using metallic calcium or strontium and because they also permit the incorporation of conventional additives such as are known to be advantageous, for instance as spreading agents for the active mass of lead-acid batteries. These conventional additives include organic natural and synthetic compounds for improving the stability of the active mass and for influencing the charging characteristics, such as lignin and phenolic resins, as well as inorganic compounds, particularly silicon compounds in the form of silicic acid or silicon dioxide which, as is well known, are highly suitable for gel formation and which are primarily used in the production of so-called dry storage batteries.

The present invention is thus particularly applicable for hermetically sealed or gas tight lead-acid batteries, while up to now predominantly alkaline storage batteries were produced as hermetically sealed batteries.

The reasons why up to now the hermetically sealed batteries were predominantly alkaline a storage battery include the following:

For producing electric storage batteries of suitable capacity and power, highly porous electrode masses are needed which should possess the maximum possible electro chemically active surface area. In contrast to alkaline electrodes, which consist of metals which may be sintered, or which as compressed bodies formed of powder possess a large effective surface combined with sufficient strength, it is not possible to form these types of electrodes of soft lead and it is not possible to produce in this manner sufficiently strong grid plates, unless a hard lead alloy is used. Thus electrode types which do not include an active mass located in or spread into cavities and indentations of the grid cannot be used for lack of sufficient capacity. Antimonated lead of which stronger grid plates can be formed has the above-discussed disadvantages and, while its mechanical or strength properties can be obtained also by exchanging the antimony with other alloying elements, it is not possible to obtain by such exchange maintenance of the initial capacity of the battery for an adequately long useful life span of the same. Since, however, antimony withdraws hydrogen from the electrolyte system and forms gases therewith which cannot be recombined to water within the battery, overcharging of a lead-acid battery containing antimony will result in an irreversible overpressure within the hermetically sealed housing. In view thereof, pressure sensitive control means for controlling the charging current are absolutely required in connection with hermetically sealed antimony-containing lead-acid batteries, although the same may also be utilized in connection with the present invention.

Primarily however, the water content in the electrolyte system must be regularly controlled, and this necessitates maintenance and expertly carried out filling of the electrolyte system of the antimony-containing sealed lead-acid battery with predetermined amounts of liquid, while by proceeding in accordance with the present invention, such maintenance and control is not necessary with respect to hermetically sealed lead-acid batteries which are free of antimony, or will become necessary only in such cases in which the control of the charging current becomes inoperative and maintenance of the battery has to be carried out in any event.

It is particularly surprising that the present invention does not only achieve elimination of known harmful side effects which are connected with the use of antimony-lead alloys but that the invention also may be successfully used in connection with any kind of antimony-free grid plates, including grids which are free of alloying components, while still achieving the advantages of the lead antimony batteries.

These surprising effects of the present invention were tested, for instance, in the following manner:

In order to obtain comparable conditions, the effect on the capacity which is achieved by the addition of 0.2% of calcium compounds to the positive mass was compared at varying electrolyte concentrations and with different electrolyte systems as well as with different types of antimony-free grid plates and, finally, in comparison batteries of identical structure and equipped with identical electrode plates.

For this purpose, a somewhat larger amount of alkaline earth metal compounds exceeding 0.2% was introduced into the electrolyte of a lead acid battery, and a non-fluid electrolyte was used in order to maintain even distribution of the alkaline earth metals and/or compounds in the electrolyte.

In order to further eliminate errors or mistakes, grid plates of pure lead having a purity of about 99.995% were used and separators of sintered polyethylene of the type commercially available under the trade name "Hostalen" which contained such amounts of inert filler materials that the two comparison cells each could take up the same amount, namely 12.1 ml. aqueous sulfuric acid having a density of 1.28 and containing 3 grams per liter of a fluorinated wetting agent known as "Fluorochemical." Such wetting agents are well known to those skilled in the art.

The standard cell contained an electrolyte system including 10 grams Hostalen and 25 grams ammonium carbonate.

In addition, the cell or battery according to the present invention, contained 20 cm.[3] calcium silicate and 20 cm.[3] silicon oxide as well as 40 grams Hostalen. All of these materials are inert with respect to sulfuric acid.

In order to conform to the testing conditions which are conventional for the starter batteries of automotive vehicles, the standard cell N and the cell according to the present invention E were repeatedly discharged so as to produce a current of 2.5 amperes and the time required for discharge was determined in minutes as a measure of the capacity of the battery.

The following values were found:

| Dishcarge No. | 1 | 2 | 3 | 4 | 5 | 6 | 7 | 8 | 9 | 10 | 15 | 50 | 100 |
|---|---|---|---|---|---|---|---|---|---|---|---|---|---|
| Battery Cell N: | 9.5 | 8.9 | 9.1 | 7.8 | 6.4 | 5.5 | 6.1 | 4.8 | 3.8 | 3.3 | 0.8 | <10% | |
| Battery Cell E: | 8.6 | 8.4 | 8.3 | 8.7 | 8.9 | 9.7 | 10.8 | 10.7 | 11.3 | 11.2 | 12.5 | 6.6 | 5.5 |

It can be seen from the table above that although the standard cell N had a somewhat higher capacity at the beginning, it possessed only 30% of its initial capacity after 10 charge and discharge cycles and after 5 further charge and discharge cycles hardly about 10% of its initial capacity were left. On the other hand, the battery cell E according to the present invention which initially had a capacity of 8.6 minutes showed an increased capacity of 12.5 minutes after 15 discharges, and upon further discharges the capacity reached a value of more than 13 minutes, corresponding to the change in capacity which has been observed in lead-acid batteries with antimony-containing grids. Even after 100 discharges, the battery cell according to the present invention still maintained far more than 50% of its initial capacity.

The above-described charge-discharge cycles of the comparison battery cells were carried out in hermetically sealed condition of the cells. No side effects were observed. The charging current was shut off after completion of charging in each cycle. Similar series of experiments with other alkaline earth metals and mixtures of alkaline earth metals, as well as other materials, indicated that— as far as could be observed—only the alkaline earth metals and particularly calcium and strontium showed the unexpected effect with respect to improving the capacity conditions upon repeated charging and discharging of the battery, whereby in some cases the best results were obtained with strontium compounds and in others with calcium compounds.

Thus, it appears that the present invention may be advantageously applied for three different purposes or under three different conditions, namely:

(1) In special cases, the present invention may be used in connection with antimony-free grid plates in open lead-acid batteries with liquid electrolytes. However, due to the greater expense involved in producing antimony-free grid plates it is possible that in may cases, even in the future, lead-antimony-grids will be used for this type of batteries, and that a certain amount of self-discharge and development of antimony hydride will be accepted for economic reasons.

(2) In connection with lead-acid batteries having antimony-free electrode plates which are in contact with a non-fluid electrolyte the active ingredient of which is aqueous sulfuric acid. In these cases the performance or energy delivery is important, and dry batteries with filler materials consisting of metal compounds such as loam, clay or kaolin, as well as calcium-containing natural substances such as lime, gypsum and cement which are not well suitable because of the impurities contained thereon, and all of which considerably increase the inner resistance of the battery do not give the desired results and cause undesirable gas development upon supercharging and upon self discharge due to which the non-fluid electrolyte system may be loosened or even partially consumed.

(3) The most important field in which highly significant advantages are achieved according to the present invention, is the field of hermetically sealed or gas-tightly closed, antimony-free lead-acid storage batteries, particularly because lead storage batteries of this type, due to the similarity of the material of the positive and negative electrodes, do not require such high charge reserves as alkaline batteries which upon reversal of polarity are subject to strong gas development. Furthermore, lead-acid batteries are considerably more economical than alkaline batteries since the materials of which the same are built are cheaper, and the sulfuric acid when used in hermetically sealed batteries cannot cause the damage which spilling sulfuric acid might cause in connection with an open battery. This up to now has been one of the main impediments in the way of using lead-acid batteries, for instance for household purposes.

Basically, it is important with respect to the use of the present invention in connection with the batteries discussed under (2) and (3) above that the electrolyte system includes filler materials which substantially consist of metal-free compounds which are insoluble in an aqueous sulfuric acid medium and which contain at least 0.2%, preferably more than 0.3% of alkaline earth metal compounds, in the form of inorganic compounds of the metals calcium and strontium. In the case of such lead-acid batteries which possess antimony-free electrode plates and preferably an electrolyte system or an electrolyte in non-fluid form consisting of a silicic acid gel holding the sulfuric acid, it is proposed according to the present invention to use as the starting material for producing the electrolyte gel, a finely pulverulent mixture of silicon dioxide and at least one alkaline earth metal compound, preferably an alkaline earth metal silicate and particularly calcium silicate or strontium silicate, whereby the average particle size of the pulverulent mixture preferably will be smaller than 30 microns and most preferably smaller than 5 microns. Reducing the particle size below 5 microns causes only an insignificant improvement in the gel formation.

As pointed out above, preferably calcium or strontium compounds are used as the additive in accordance with the present invention and preferably the silicates thereof, however it is also possible to use the sulfates and phosphates of these two alkaline earth metals.

It has been found that the results obtained with the chlorates, chorides, chromates, carbonates, nitrates and nitrides of calcium and strontium are not satisfactory.

The essential constituent of the electrolyte is the sulfuric acid which conventionally has a density or specific gravity of 1.28. The non-fluid electrolyte may contain the desirable alkaline earth metal compound such as calcium silicate or strontium silicate, in an amount of up to about 80% of the weight of the sulfuric acid, or a portion of the alkaline earth metal silicate may be replaced by gel forming filler materials such as silicon dioxide. These additions to the electrolyte have the purpose to thicken the same sufficiently so that the electrolyte will be no longer fluid in free flowing condition, in other words so that the electrolyte will be non-fluid. It can be achieved thereby that portions of the negative electrodes which do not face positive electrodes, such as the rear faces of the negative electrodes of a set consisting of two negative electrodes with a positive electrode interposed therebetween, will not be covered by electrolyte and may be in contact with a gas space within the cell. These portions of the negative electrodes can then react with the oxygen present in the gas space so that no undesirable overpressure will be formed in such battery upon operation of the same in hermetically sealed condition.

Very good results are obtained by admixing to the aqueous sulfuric acid electrolyte between about 20 and 30% of the alkaline earth metal compound such as calcium and/or strontium silicate.

The effect of such alkaline earth metal compound addition to the electrolyte which may amount to between 0.2% and 80%, and preferably between 20 and 30%, of the weight of the aqueous sulfuric acid constituent of the non-fluid electrolyte, will be better than that which is achieved by admixing the desired alkaline earth metal compound to the active masses of the electrode plates.

However, it is also within the scope of the present invention to incorporate the alkaline earth metal compound such as calcium or strontium silicate, into the active masses of the electrodes which, in the case of the positive electrode, consist essentially of $PbO_2$ and, in the case of negative electrode, of Pb. Since the active mass is essential for the electrochemical reaction in the battery, only up to about 25% of the same may be replaced by an admixture of the alkaline earth metal compound. The preferred proportion of alkaline earth metal compound in the active mass of the electrodes of the lead-acid battery will be about 5% of the weight of the active mass.

A type calcium silicate which has been found eminently suitable as admixture to the non-fluid electrolyte or to the active masses of the antimony-free lead-acid batteries according to the present invention is commercially available under the trade name "Calflo E."

The following examples of thickened, non-fluid electrolytes according to the present invention are given as illustrative only, without, however, limiting the invention to the specific details of these examples.

EXAMPLE I

| | | |
|---|---|---|
| Sulfuric acid, density 1.28 | liter | 1 |
| Calcium silicate (Calflo E) | grams | 250 |

EXAMPLE II

| | | |
|---|---|---|
| Sulfuric acid, density 1.28 | liter | 1 |
| Calcium silicate (Calflo E) | grams | 16 |
| Crystalline silicon dioxide (Aerosil) | do | 1 |
| Kieselguhr | do | 11 |

EXAMPLE III

| | | |
|---|---|---|
| Sulfuric acid, density 1.28 | liter | 1 |
| Calcium silicate (Calflo E) | grams | 5 |
| Crystalline silicon dioxide (Aerosil) | do | 10 |
| Kieselguhr | do | 15 |

A lead-acid battery with an electrolyte containing the above-described alkaline earth metal compounds, i.e., preferably calcium and/or strontium silicates, phosphates or sulfates and which is at least partially contained in the pores of absorbent separator sheets or mats of synthetic material or glass fibers should be constructed in such a manner that the alkaline earth metal compounds will be contained also in the pores of the surface portion of the separator which is in direct contact with the positive active mass of the adjacent positive electrode. It is possible thereby, by using an electrolyte which is partially held in the capillaries of the separator and which preferably contains at least 0.3% by weight of alkaline earth metal compounds of the type described above, to achieve the effect of to the present invention.

Additional particularly advantageous structural features of the antimony-free lead-acid battery of the present invention will be described in connection with the drawing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic plan view on a reduced scale of a battery according to the present invention;

FIG. 2 is an elevational cross sectional view on a somewhat larger scale of the battery illustrated in FIG. 1, taken along line II—II of FIG. 1;

FIG. 3 is an enlarged cross sectional view of the auxiliary electrode forming part of the battery illustrated in FIG. 2; and FIG. 4 is a fragmentary elevational cross sectional view on an enlarged scale of the lower portion of the battery illustrated in FIG. 2, taken perpendicular to the cross section shown in FIG. 2.

The drawing shows a two-cell lead-acid dry battery which may be hermetically sealed. Cover 1 and container 2, form the housing of the battery and may consist essentially of thermoplastic synthetic material, cover 1 and container 2 are fluid-tightly adhered to each other, for instance, by application of a suitable solvent for the thermoplastic material.

As may be seen in FIG. 4, each cell comprises four negative electrode plates 3 and two positive electrode plates 4. The outwardly leading terminals 3' and 4' are indicated at the cover 1 in FIG. 1 as — and +. Reference numeral 5 indicates an insulating covering of conductive bridge 6 which connects the two cells. The above-mentioned elements of the battery are air tightly arranged by means of rubber elements 7 and 7' and are firmly anchored in cover 1 by casting mass 5.

The spaces between adjacent surfaces of electrode plates 3 and 4, which electrode plates may consist of antimony-free, dispersion-hardened lead grids with active mass spread into the interstices and cavities thereof, are completely filled by electrolyte 8. The electrolyte consists of a paste formed of silicon dioxide, dilute sulfuric acid having a density of 1.28 and a 25% addition of calcium silicate. The silicon dioxide may be the material commercially available under the trade name "Aerosil" which is practically free of foreign materials or impurities, and the calcium silicate may be the commercially available material known as "Calflo E" which contains primarily calcium silicate, however, in addition, also traces of magnesium-containing silicon dioxide powder.

The average particle size of the pulverulent mixture of the paste-forming silicon compounds preferably is smaller than 30 microns and most preferably between 1 and 2 microns with maximum particle sizes of up to 5 microns. In order to form the electrolyte paste, 1 liter of dilute sulfuric acid having a density of 1.28 is added to 250 grams of the above described pulverulent mixture.

Absorbent separator sheets 9 consisting of a conventional glass fiber mesh, take up a portion of the electrolyte gel so that electrolyte paste including calcium silicate and located in the pores of the separator contacting the positive electrode surface, will be in direct contact with the positive active mass of electrodes 4. This will also accomplish that the positive active mass is additionally mechanically supported so that it will be prevented from falling off the grid, and also that, upon oxygen gas development due to supercharging, the rising of the small oxygen gas bubbles is facilitated, the latter will be finely subdivided and consequently, no permanent gel-free cracks or fissures will be formed within the electrolyte gel body. It is well known that the electrolyte gel is thixotropic and, consequently, after passage of the oxygen gas bubbles therethrough, the gel substantially reverts to its prior condition, i.e., it becomes again a continuous body without cracks or fissures therethrough.

The uncovered negative electrode surface portions, i.e., the outwardly directed surface portions of the negative electrodes of each set of electrodes, which do not contact a layer of electrolyte, serve for the absorption of oxygen gas and, for this purpose, these free electrode surfaces must be neither too wet nor too dry. This is preferably accomplished by forming the electrolyte gel in such a manner that the same contains only about 90% of the amount of aqueous sulfuric acid which could be bound by gel 8 and separators 9, while, on the other hand, negative electrode plates 3 are relatively thin, as compared with positive plates 4, and so dimensioned that complete penetration of the electrolyte mass throughout the entire thickness of the negative electrode plates is assured.

Very good results are obtained with the combination of positive plates having a thickness of between about 1.8 and 2 millimeters and negative plates having a thickness of about 0.9–1.2 millimeters.

It is achieved in this manner that the electrochemical reactions and wetting of the negative electrode plates with the electrolyte will take place throughout the entire thickness, from the face of the negative electrode plate which is adjacent the positive plate, through the negative active mass to the surface of the negative electrode which is in contact with the free gas space.

The above-described difference in the thickness of the negative and positive electrodes, and thus also the difference between the amount of negative active mass and positive active mass within each electrode set or within each cell of the battery serves also for partial compensation of the fact that two negative electrodes are associated with one positive electrode. Since the negative electrodes are considerably thinner than the positive electrode, the excess of negative active mass as compared with positive active mass within each set of electrodes will be equal to only about 50% of the total amount of positive active mass. In contrast to alkaline storage batteries of this type, the excess of negative active mass of about 50% is entirely sufficient, since in a lead-acid battery, even upon reversal of polarity, at first no gas is developed due to the fact that both electrodes consist of the same metal and consequently at first only a discharge of the electrodes takes place.

Thus, broadly, it could be said that each of the two negative electrodes should have a thickness equal to about half the thickness of the positive electrode.

When introducing the electrolyte gel 8 and separators 9 into the battery housing, prior to starting operation of the lead-acid battery, electrode plates 3 and 4, i.e., the electrodes of both polarities, are still in wet condition, wetted with forming acid. The plates are formed to such an extent that the positive plates are substantially completely charged while the negative plates contain at least the same amount of charge as the positive plates, or preferably about 20% more. The unavoidable self-discharge of the negative plates is thus taken care of and the discharge of the battery will remain limited by the capacity of the positive electrode during the entire life span of the battery.

On the other hand, there still will be available for the charging of the battery about 30% of uncharged negative mass which will serve for the absorption of oxygen gas so that the charging is safely limited by the charging capacity of the positive plate and, upon continuous supercharging gas development will be limited to the development of oxygen gas.

The cross sectional view of the battery cell shown in FIG. 2 is about half of actual size and such cell, containing 80 grams positive and 120 grams negative lead active mass has a nominal capacity of 8 a.h. and contains 270 grams of electrolyte gel which includes an amount of the actual electrolyte, i.e., aqueous sulfuric acid which corresponds to that of conventional lead-acid batteries operating with a fluid aqueous sulfuric acid electrolyte. A cell of the illustrated type may be continuously charged for very long periods of time with a current of 1 ampere, without causing excess oxygen pressure within the sealed housing to rise to more than about 1 atmosphere gauge pressure. After about 2000 hours of continuous supercharging, the negative absorption surfaces finally will become inoperative due to oxidation.

In order to be able to withstand short periods of extremely high current charges without requiring maintenance of the battery and without causing an undue increase in gas pressure, the battery cell according to FIG. 2 is additionally provided with a stopper-type auxiliary device 10 which is actuated by gaseous oxygen and which is shown in FIG. 3 in cross section on an enlarged scale. The stopper 11 of synthetic material which is screwed into cover 1 holds at its lower end portion a carbon cylinder 12 threadedly connected to stopper 11, and carbon cylinder 12 is conductively connected by means of screw bolt 13 to contact sleeve 14.

Contact sleeve 14 serves for attaching a current conducting cable (not shown) and rests with an annular flange 15 at an inner shoulder of the stopper, within a space 18 formed in the stopper, and is fluid-tightly covered with casting resin 16. The inner space 18 within the stopper is closed by stopper cover 17. Cylinder 12 consists of porous carbon and penetrates downwardly into gel paste 8 so that the cylinder 12 will be continuously wetted with sulfuric acid. In this manner, carbon cylinder 12 will operate as an auxiliary electrode, for instance of a volume of 7 cm.³, against the negative electrode 3 and will deliver, under normal operating conditions, a residual current of between 1 and 3 ma., depending on the oxygen gas pressure within the battery. A small proportion of the oxygen gas developed in the battery will be reduced to water thereby with the help of the electrolyte.

In the event that the oxygen gas pressure rises, due to supercharging, to more than 1 atmosphere gauge pressure, the current from the auxiliary electrode 12 to the negative electrode 3 will rise to a multiple of the residual current, up to nearly 10 ma. and this stronger current may be utilized in a manner known per se, directly by means of a switching relay, or by way of a transistor-direct current amplifying circuit, for controlling a source of charging current (not shown). It generally suffices to arrange the above-described auxiliary device in one of a plurality of battery cells.

If the auxiliary device is arranged only in one of the cells, the other cells or second cell, which is seen from above in FIG. 1, is closed by blind stopper 19 having the same over-all shape and dimensions as the above-described stopper 11 of synthetic material. It is of course possible for greater safety, in the case of multicell lead-acid storage batteries, to include within a cell, which for pressure control purposes contains the above-described auxiliary device, a somewhat smaller excess of negative mass than in the other cells, so that the overpressure in the cells which are not directly checked or controlled will always be smaller than in the cell provided with the auxiliary control device. It is also possible to arrange for an equilibrium of gas pressure between the individual cells of the battery, in which case, however, care must be taken that no electric cross connection between the cells is formed due to contact between the electrolytes of the respective cells.

It is also possible, in a manner known per se, to use relatively simple and cheaper auxiliary devices such as mechanically operating pressure switches. In this case, however, the battery will not operate without maintenance because the control or cut-off of the charging current or the interruption of the same, once the pressure switch has been actuated, will continue until the overpressure has been eliminated or has slowly dissipated, before the charging can be continued. In certain cases, it will also be desirable to provide an overpressure relief valve which may include a frangible membrane, in addition to the auxiliary control device or in place of the same, depending on the operating conditions. These various safety devices per se are well known to those skilled in the art.

Operation of the battery shown in FIGS. 1–3 will now be described with particular reference to the partial cross sectional view of FIG. 4.

The oxygen gas formed upon supercharging at positive electrode 4 will rise through glass fiber mats 9 without significant displacement of gel paste 8 and will reach the gas space within the cell which is illustrated in FIG. 2 at the outwardly facing sides of the negative plates 3. The oxygen gas which will be under slight overpressure will cause oxidation of uncharged lead active mass which concurrently will be again reduced and thus charged by the charge passing through the thickness of the negative electrode in the direction from the face thereof which is adjacent to the positive electrode towards the free face which is in contact with the gas space. In the case of currents of up to 1 ampere, only heat will be produced thereby within the lead-acid battery while the chemical composition will remain unchanged. Dropping of positive lead active mass from the grid is not possible thereby and the rated capacity of the positive electrode, which due to the presence of calcium or strontium silicate is assured over the entire useful life span of the battery, will be comparable to that of conventional lead-acid batteries with liquid electrolyte.

All electrode plates 3 and 4 are immersed with their lower edges in a layer of gel paste 8 which covers the bottom of the cell housing, whereby the negative plates extend further downwardly than the positive plates. It is achieved thereby that even prolonged operation of the battery and the unavoidable growth of the positive grid plates 4 due to extension of the mass therein by the charging processes, will not cause an undesirable contact or mechanical pressure between the positive grid plates 4 and the housing 2. The negative plates 3 are sufficiently fixed in their position, on the one hand by the gel paste 8 and on the other hand by the arrangement of spacers 21 of synthetic material which are in contact with the surfaces of the negative electrode plates facing gas spaces 20. Spacers 21 preferably consist of corrugated sheets and serve for several purposes, namely to maintain gas spaces 20 free of gel paste 8 and furthermore as resilient supports so that the free surfaces of two negative plates 3 which face each other are driven apart, or are pressed away from the inner face of the housing towards the electrolyte 8 and separator 9 whereby a uniform contact and pressure between all electrode surfaces and the contacting electrolyte system is achieved.

The combination of the structural characteristics of the battery described above by way of example only with the inventive incorporation of preferably calcium or strontium silicate in the electrolyte and preferably also in the electrodes, will increase the reliability of the operation and the length of the useful life span of the battery. In the case of relatively small lead-acid batteries, it is also possible in accordance with the present invention, to provide, in a manner known per se, coaxial cylindrical electrodes, whereby preferably the innermost electrode is a negative electrode formed as a self-supporting hollow cylinder and whereby instead of corrugated sheets 21, grooved cylinders may be used.

It will be understood that each of the elements described above, or two or more together, may also find a useful application in other types of batteries differing from the types described above.

While the invention has been illustrated and described as embodied in a lead-acid battery with non-fluid electrolyte, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a hermetically sealed lead-acid storage battery having a gas space, in combination, electrodes of opposite polarity, each of said electrodes comprising grid plate means consisting essentially of lead and being free of antimony, and an active lead mass supported by said grid plate means, respectively; and a non-fluid electrolyte interposed between and contacting adjacent electrodes of opposite polarity, said nonfluid electrolyte consisting essentially of a mixture of aqueous sulfuric acid and a thickening agent in an amount sufficient to render said electrolyte non-fluid and including an alkaline earth metal compound selected from the group consisting of the silicates, sulfates and phosphates of calcium and strontium and being present in an amount in excess of 0.2% of the weight of said aqueous sulfuric acid.

2. A lead acid storage battery, as defined in claim 1, wherein said alkaline earth metal compound is present in said non-fluid electrolyte in an amount in excess of 0.2% and up to 80% of the weight of said aqueous sulfuric acid thereof.

3. A lead acid storage battery, as defined in claim 1, wherein said aqueous sulfuric acid has a specific gravity of about 1.28.

4. A lead acid storage battery, as defined in claim 1, wherein said alkaline earth metal compound is selected from the group consisting of calcium silicate and strontium silicate.

5. A lead acid storage battery, as defined in claim 1, wherein said thickening agent is a mixture of silicon dioxide and, at least one alkaline earth metal compound selected from the group consisting of calcium silicate and strontium silicate, wherein said alkaline earth metal compound is present in said non-fluid electrolyte in an amount of between 20 and 30% of the weight of said aqueous sulfuric acid thereof, and wherein said aqueous sulfuric acid has a specific gravity of about 1.28.

6. A lead acid storage battery, as defined in claim 1, wherein the amount of said aqueous sulfuric acid in said non-fluid electrolyte is less than the maximum amount of aqueous sulfuric acid capable of being contained in the thickening agent of said non-fluid electrolyte.

7. A lead acid storage battery, as defined in claim 1, wherein said grid plate means consists of lead having a purity of about 99.995%.

8. A lead acid storage battery, as defined in claim 1, wherein said grid plate means consists of dispersion-hardened, metal oxides-containing lead.

9. A lead acid storage battery, as defined in claim 1, wherein said thickening agent of said non-fluid electrolyte is formed of a pulverulent mixture of silicon oxide and said alkaline earth metal compound, and wherein the average particle size of said pulverulent mixture is less than 30 microns.

10. A lead acid storage battery, as defined in claim 1, and including absorptive separators located between adjacent electrodes of opposite polarity in direct contact with the positive one of said adjacent electrodes of opposite polarity, wherein aqueous sulfuric acid including an alkaline earth metal compound is at least partially absorbed in said separator by capillary action, so that a portion of said alkaline earth metal compound is in direct contact with said positive electrode.

11. A lead storage battery as defined in claim 1, wherein said electrodes of opposite polarity are arranged in at least one set, said set consisting essentially of two negative electrodes and one positive electrode interposed between and spaced from said negative electrodes, said negative electrodes having outer faces contacting said gas space, and the total active mass of the negative electrodes of said set being equal to about 150% of the total active mass of the positive electrode of said set, and wherein the positive electrode of said at least one set is substantially completely charged, and the charge of said negative electrodes is equal to between about 100 and 120% of the charge of said positive electrode so that the negative electrodes—due to the larger amount of active mass of the same—include about 30% of uncharged negative active mass.

12. A storage battery as defined in claim 1, wherein said electrodes of opposite polarity are arranged in at least one set, said set consisting essentially of two negative electrodes and one positive electrode interposed between and spaced from said negative electrodes, and control means located within said housing for switching off a charging current when—due to supercharging—an oxygen gas over-pressure above a predetermined level is formed within said housing, said control means comprising a carbon electrode located in said housing spaced from said electrodes of opposite polarity and in contact with said electrolyte so that said carbon electrode forms with the negative electrodes of said set an auxiliary battery which will reduce gaseous oxygen in said housing under formation of water and of an electric current, the latter increasing with increasing oxygen gas pressure in said housing, so that when the oxygen gas pressure reaches said predetermined level the strength of the thus produced auxiliary current will suffice to actuate shut-off means for a charging current.

13. A lead storage battery as defined in claim 1, wherein said electrodes of opposite polarity are arranged in at least one set, said set consisting essentially of two negative electrodes and one positive electrode interposed between and spaced from said negative electrodes, and including a housing having a bottom, said set of electrodes extending upwardly in said housing spaced from said bottom with the lower edge of said positive electrode being spaced farther from said bottom than the lower edge of said negative electrodes, and wherein a portion of said non-fluid electrolyte is located in said housing in contact with said bottom and extending upwardly therefrom to a level above the lower edges of said electrodes.

14. A lead storage battery as defined in claim 1, wherein said electrodes of opposite polarity are arranged in at least two sets, each set consisting essentially of two negative electrodes and one positive electrode interposed between and spaced from said negative electrodes, and spacer means located between and in contact with adjacent outer faces of adjacent ones of said sets for maintaining said adjacent sets in spaced relationship and for exerting pressure on said adjacent outer faces of said adjacent sets in direction towards the positive electrodes, respectively, of said adjacent sets.

15. A lead acid storage battery, as defined in claim 6, wherein the amount of said aqueous sulfuric acid is equal to about 90% of the amount thereof which may be contained in the thickening agent of said electrolyte without rendering the latter fluid.

16. A lead acid storage battery, as defined in claim 9, wherein said thickening agent of said non-fluid electrolyte is formed of a pulverulent mixture of silicon oxide and of an alkaline earth metal compound selected from the group consisting of calcium silicate and strontium silicate, and wherein the average particle size of said pulverulent mixture is less than 5 microns.

17. A lead acid storage battery, as defined in claim 11, wherein said electrolyte penetrates throughout the thickness of said negative electrodes so that the outer faces of said negative electrodes which contact said gas space include a portion of said electrolyte.

18. A lead acid storage battery, as defined in claim 11, including a hermetically sealed housing; and pressure sensitive control means located within said housing for switching off a charging current when during charging of said battery a predetermined degree of overpressure is reached within said hermetically sealed housing.

19. A lead acid storage battery, as defined in claim 13, wherein said non-fluid electrolyte extends upwardly above the upper edges of said electrodes.

References Cited
UNITED STATES PATENTS

| | | | |
|---|---|---|---|
| 1,201,481 | 10/1916 | McGall et al. | 136—157 |
| 1,403,462 | 1/1922 | Williams | 36—157 |
| 1,496,725 | 6/1924 | Moore | 136—157 |
| 2,951,106 | 8/1960 | Ruetschi | 136—26 |
| 3,080,440 | 3/1963 | Ruetschi et al. | 136—26 |
| 3,150,012 | 9/1964 | Tanaka | 136—157 |
| 3,172,782 | 3/1965 | Jache | 136—26 |
| 3,174,879 | 3/1965 | Stanimirovitch | 136—6 |
| 3,227,583 | 1/1966 | Carlisle | 136—26 |

WINSTON A. DOUGLAS, Primary Examiner

C. F. Le FEVOUR, Assistant Examiner

U.S. Cl. X.R.

136—6, 157